United States Patent
Njeim (10) Patent No.: US 11,753,104 B1
(45) Date of Patent: Sep. 12, 2023

(54) SUSPENSION SYSTEM FOR A ONE-WHEELED TRANSPORTATION DEVICE AND METHOD

(71) Applicant: Antoine M. Njeim, Astoria, NY (US)

(72) Inventor: Antoine M. Njeim, Astoria, NY (US)

(*) Notice: Subject to any disclaimer, the term of this patent is extended or adjusted under 35 U.S.C. 154(b) by 107 days.

(21) Appl. No.: 17/592,611

(22) Filed: Feb. 4, 2022

Related U.S. Application Data (60) Provisional application No. 63/273,358, filed on Oct. 29, 2021.

(51) Int. Cl.
*B62K 1/00* (2006.01)
*B62K 25/14* (2006.01)

(52) U.S. Cl.
CPC .............. *B62K 1/00* (2013.01); *B62K 25/14* (2013.01)

(58) Field of Classification Search
CPC ..... A63C 17/12; A63C 17/0046; A63C 17/18; A63C 2203/12; A63C 2203/42; B60G 3/20; B60G 17/00; B62K 1/00; B62K 25/14; B62K 3/00; B62K 11/007
USPC .................................................. 180/7.1, 181
See application file for complete search history.

(56) References Cited

U.S. PATENT DOCUMENTS

| | | | |
|---|---|---|---|
| 9,962,597 B2 | 5/2018 | Doerksen et al. |
| 10,010,784 B1 | 7/2018 | Doerksen et al. |
| 10,343,050 B2 | 7/2019 | Doerksen et al. |
| 10,343,051 B2 | 7/2019 | Doerksen et al. |
| 11,123,629 B1 | 9/2021 | Doerksen et al. |

*Primary Examiner* — Minnah L Seoh
*Assistant Examiner* — Felicia L. Brittman
(74) *Attorney, Agent, or Firm* — Ted Masters

(57) ABSTRACT

A suspension system for a one-wheeled transportation device is disclosed. The one-wheeled transportation device includes (1) a wheel, and (2) a tiltable platform has a top side, a bottom side, a first end, a second end, a central longitudinal axis, and an aperture which is shaped and dimensioned to receive the wheel. The suspension system includes a wheel holder which rotationally carries the wheel, the wheel holder having a proximal end and an opposite distal end, the proximal end is pivotably connected to the second end of the tiltable platform so that the distal end resides above the top side at the first end. A bracket has a proximal end and an opposite distal end, the proximal end is connected to the tiltable platform so that the distal end of the bracket upwardly extends above the wheel. A shock absorber is connected between the distal end of the wheel holder and the distal end of the bracket.

24 Claims, 9 Drawing Sheets

SUSPENSION SYSTEM FOR A ONE-WHEELED TRANSPORTATION DEVICE AND METHOD

CROSS REFERENCE TO RELATED APPLICATION

This application claims the filing benefit under 35 U.S.C. § 119(e) of U.S. Provisional Application No. 63/273,358, filed Oct. 29, 2021, which is hereby incorporated by reference.

TECHNICAL FIELD

The present invention pertains generally to one-wheeled transportation devices, and more particularly to a suspension system for such a device.

BACKGROUND OF THE INVENTION

One-wheeled transportation devices are known in the art. One such device consists of a self-balancing tiltable platform upon which a user stands and rides, and is commonly known as a one-wheeled skateboard. A large wheel (much larger than those of conventional skateboards) is disposed in the center of the board, and the user straddles the wheel. The wheel is an electric motor which is controlled by a controller which is disposed beneath the platform. A battery which is also disposed beneath the platform provides power. The user controls movement of the device via foot-activated pressure switches. The one-wheeled transportation device can be propelled over various support surfaces.

BRIEF SUMMARY OF THE INVENTION

The present invention is directed to a suspension system for a one-wheeled transportation device. The suspension system dampens the motion of the one-wheeled transportation device as it travels over an uneven support surface. The suspension may be sold in kit form and added (by retrofit) to an existing one-wheeled transportation device. Or the suspension system may be installed by the original equipment manufacturer. If added by retrofit the suspension system is easy to install and requires minimal permanent modification to the existing one-wheeled transportation device. In one embodiment the suspension system can be installed by simply drilling mounting holes in the existing one-wheeled transportation device.

In accordance with an embodiment, a one-wheeled transportation device with a suspension system includes a wheel having a diameter and an axis of rotation, a tiltable platform having a top side, a bottom side, a first end, a second end, a central longitudinal axis, and an aperture which is shaped and dimensioned to receive the wheel. A wheel holder which rotationally carries the wheel and has a proximal end and an opposite distal end, the proximal end is pivotably connected to the second end of the tiltable platform so that the distal end resides above the top side at the first end. A bracket has a proximal end and an opposite distal end, the proximal end is connected to the tiltable platform so that the distal end of the bracket upwardly extends above the wheel. A shock absorber is connected between the distal end of the wheel holder and the distal end of the bracket.

In accordance with another embodiment, the proximal end of the wheel holder includes a first proximal end and a second proximal end. The first proximal end and the second proximal end are both pivotably connected to the bottom side of the tiltable platform so that the wheel holder passes though the aperture of the tiltable platform.

In accordance with another embodiment, a first spindle is disposed at the first proximal end and a second spindle is disposed at the second proximal end, the first and second spindles are pivotably connected to the bottom side of the tiltable platform.

In accordance with another embodiment, the wheel holder has a central axis. The wheel holder is connected to the one-wheeled transportation device so that the central axis of the wheel holder forms an angle of between 10° and 30° with the central longitudinal axis of the tiltable platform.

In accordance with another embodiment, the wheel has an axis of rotation, the wheel holder is connected to the one-wheeled transportation device so that the axis or rotation of the resides between the top side and the bottom side of the tiltable platform.

In accordance with another embodiment, the wheel of the one-wheeled transportation device has a diameter. The wheel holder has a length, the length being greater than the diameter of the wheel.

In accordance with another embodiment, the shock absorber has a longitudinal axis. The longitudinal axis of the shock absorber forms an angle of between 40° and 60° with the central longitudinal axis of the tiltable platform.

In accordance with another embodiment, the wheel holder has an inward bend.

Other embodiments, in addition to the embodiments enumerated above, will become apparent from the following detailed description, taken in conjunction with the accompanying drawings, which illustrate, by way of example, the principles of the suspension system for a one-wheeled transportation device and method.

DETAILED DESCRIPTION OF THE INVENTION

Referring initially to FIGS. 1-4 there are illustrated perspective, side elevation and exploded perspective views of a prior art one-wheeled transportation device, generally designated as 500. One-wheeled transportation device 500 includes a wheel 502 which has a diameter D, an axle 503, and an axis of rotation 507. One-wheeled transportation device 500 also includes a tiltable platform 504 which has a top side 506, a bottom side 508, a first end 510, a second end 512, an aperture 514 which is shaped and dimensioned to receive wheel 502, and a central longitudinal axis 516. It is noted that as shown first end 510 includes all components disposed on the left of the centerline 505 of tiltable platform 504, and second end includes all components disposed on the right of centerline 505 which bisects tiltable platform 504. It is noted that centerline 505 is perpendicular to the central longitudinal axis 516 of platform 504 (see discussion below). Top side 608 of tiltable plafform 504 includes a planar support surface 509 upon which a user places his/her feet.

Prior art one-wheeled transportation device 500 travels upon a support surface 600 such as pavement, dirt, grass, or the like. In the shown embodiment the direction of forward motion is shown by arrows 520. In this embodiment a controller 522 is disposed in first end 510 between top side 506 and bottom side 508, and a battery 524 is disposed in second end 512 between top side 506 and bottom side 508. It may be appreciated however that the definition of ends 510 and 512 could be reversed with the first end 510 having battery 524 and the second end 512 having controller 522 (refer to FIG. 13).

Figure 1:
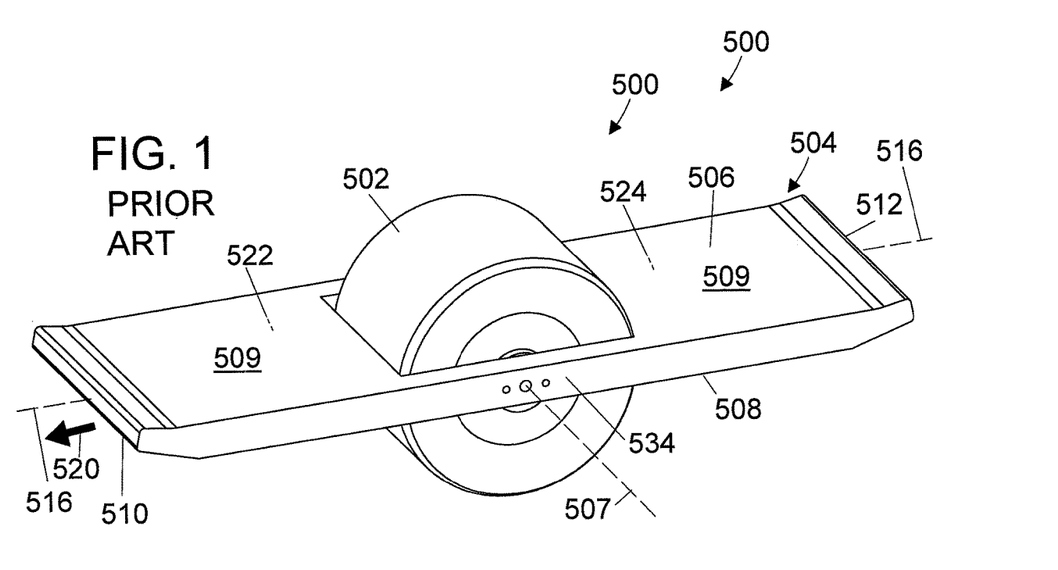
FIG. 1 is a perspective view of a prior art one-wheeled transportation device.
Figure 2:
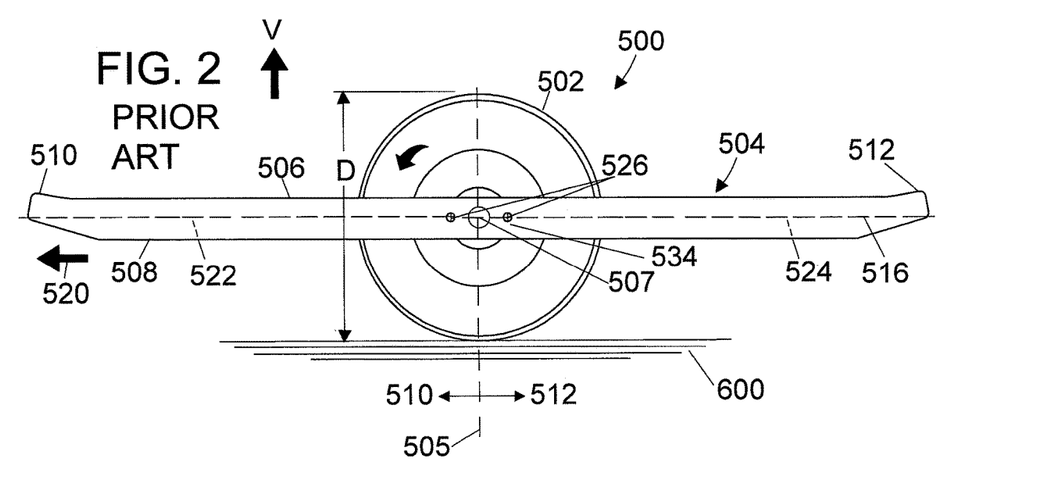
FIG. 2 is a side elevation view of the prior art one-wheeled transportation device.
Figure 3:
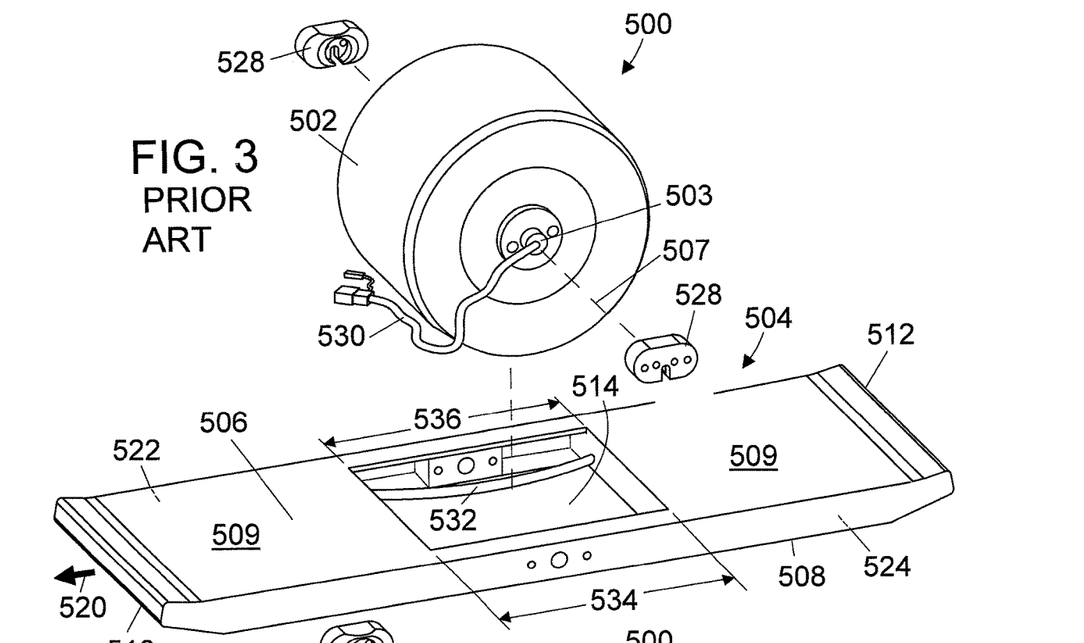
FIG. 3 is an exploded perspective view of the prior art one-wheeled transportation device.
Figure 4:
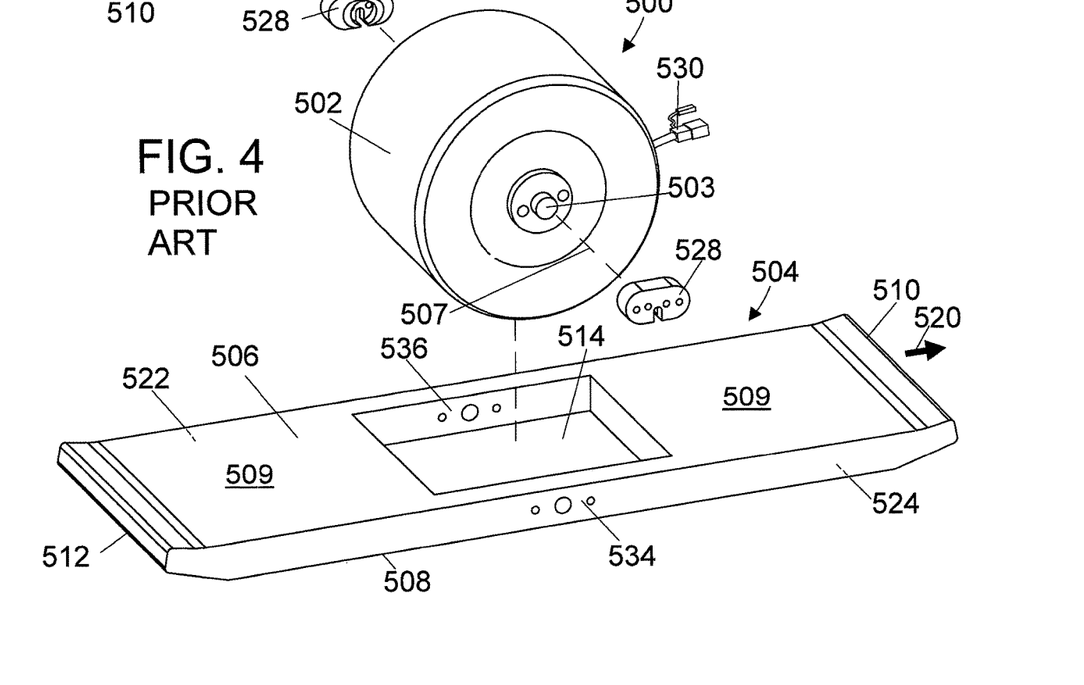
FIG. 4 is a reverse exploded perspective view of FIG. 3.
Figure 5:
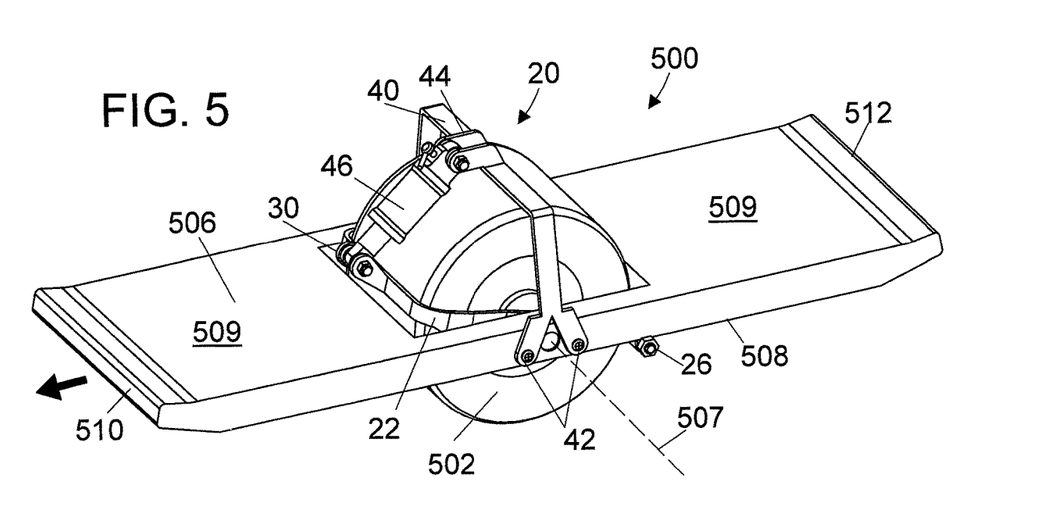
FIG. 5 is a perspective view of the prior art one-wheeled transportation device with the present suspension system installed.

The exploded views of FIGS. 3 and 4 show wheel 502 removed from tiltable platform 504. To effect the removal two screws 526 are removed from each side of tiltable platform 504. Then two additional screws (not shown) are removed to detach axle blocks 528 from wheel 502. Axle blocks 528 are used to connect wheel 502 to tiltable platform 504. Also shown in FIG. 3 is a motor cable 530 which has been removed from controller 522, and motor cable 532 which runs from battery 524 to controller 522. Tiltable platform 504 further includes first 534 and second 536 side rails which form the transition from first end 510 to second end 512.

Figure 9:
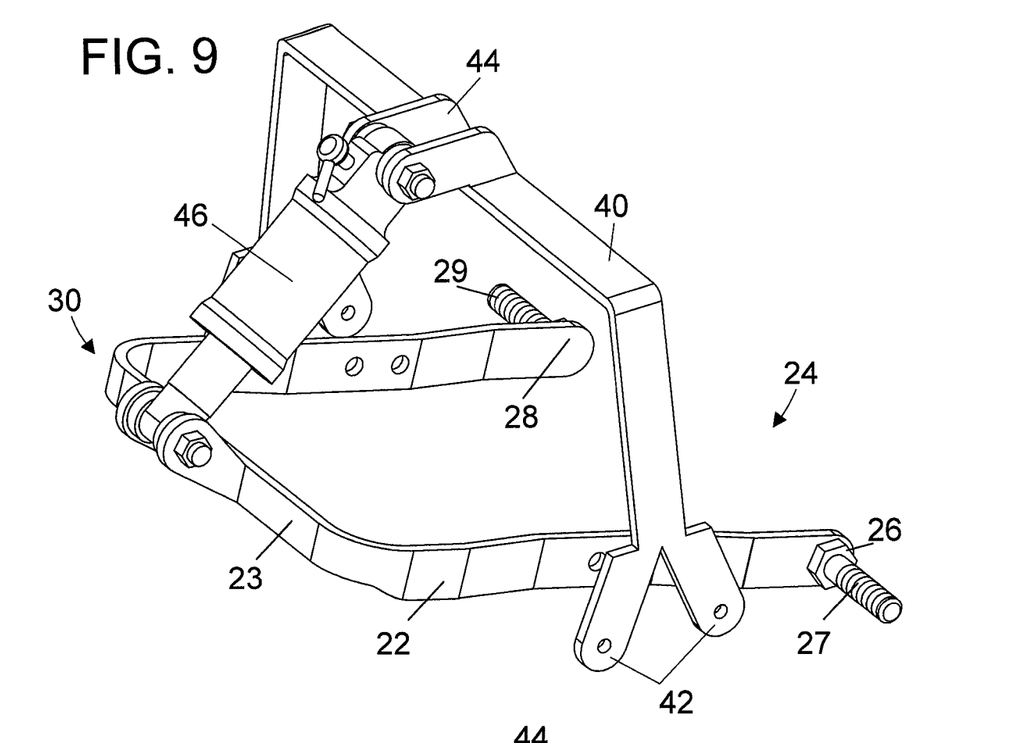
FIG. 9 is an enlarged perspective view of the suspension system.
Figure 10:
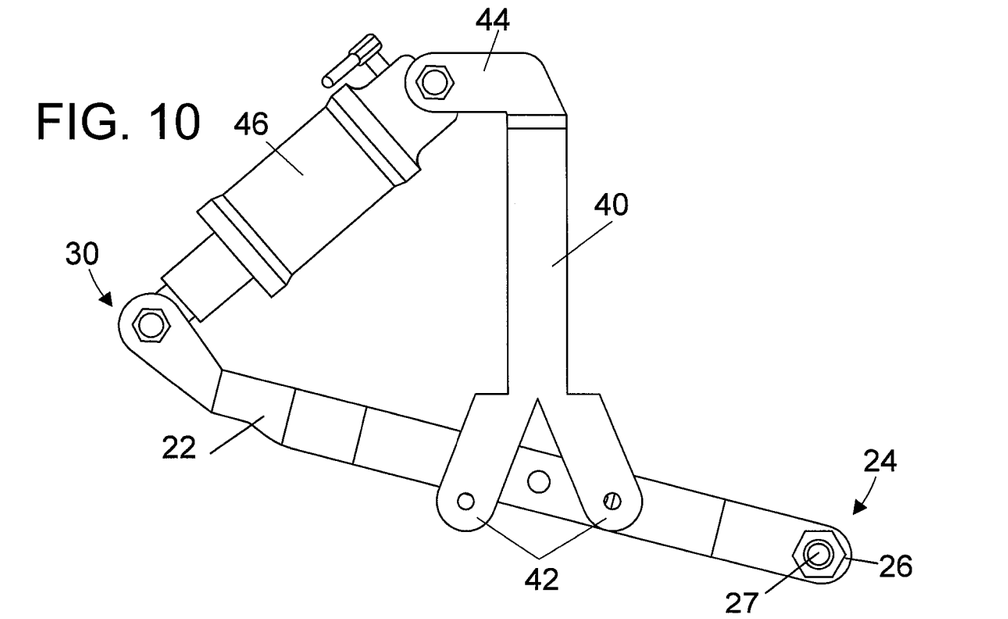
FIG. 10 is an enlarged side elevation view of the suspension system.
Figure 11:
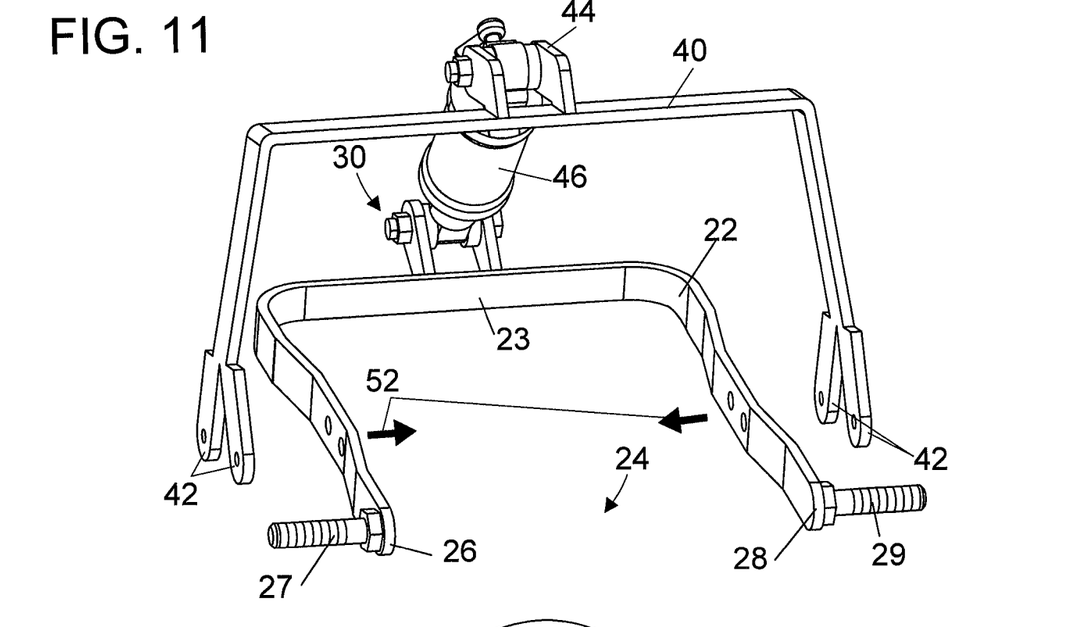
FIG. 11 is an enlarged end perspective view of the suspension system.

Now referring to FIGS. 5-8 there are illustrated perspective and side elevation views of prior art one-wheeled transportation device 500 with the present suspension system 20 installed. And FIGS. 9-11 show various perspective views of suspension system 20.

Figure 12:
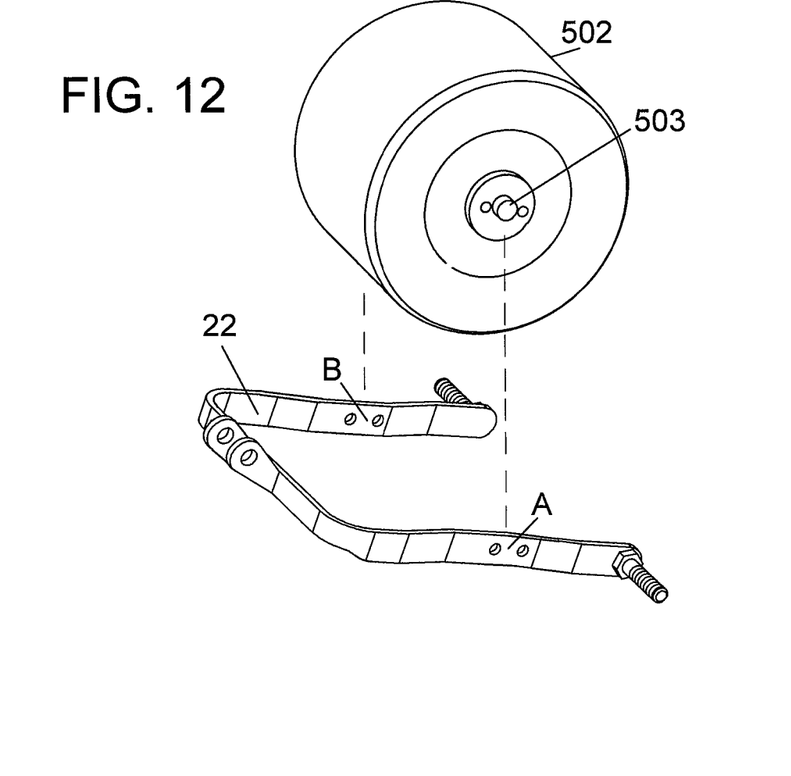
FIG. 12 is an exploded perspective view of a wheel and a wheel holder.

Suspension system 20 includes a wheel holder 22 which is configured to rotationally carry wheel 502. Referring also to FIGS. 3 and 12, the axle 503 of wheel 502 is connected to wheel holder 22 between stations A and B of wheel holder 22. That is, in the present suspension system 20 wheel 502 is not connected to tiltable platform 504 via axle blocks 528 (refer to FIGS. 3-4), but instead is only connected to wheel holder 22. As such, wheel 502 in effect floats on wheel holder 22. Wheel holder 22 has a proximal end 24 and an opposite distal end 30. Proximal end 24 is pivotably connectable to the second end 512 of tiltable platform 504 so that distal end resides above top side 506 at first end 510. It is noted that as used herein the terms top side, bottom side, above, upwardly, and the like apply when planar surface 509 of tiltable platform 504 is oriented perpendicular to local vertical V (refer to FIGS. 2 and 6).

Figure 6:
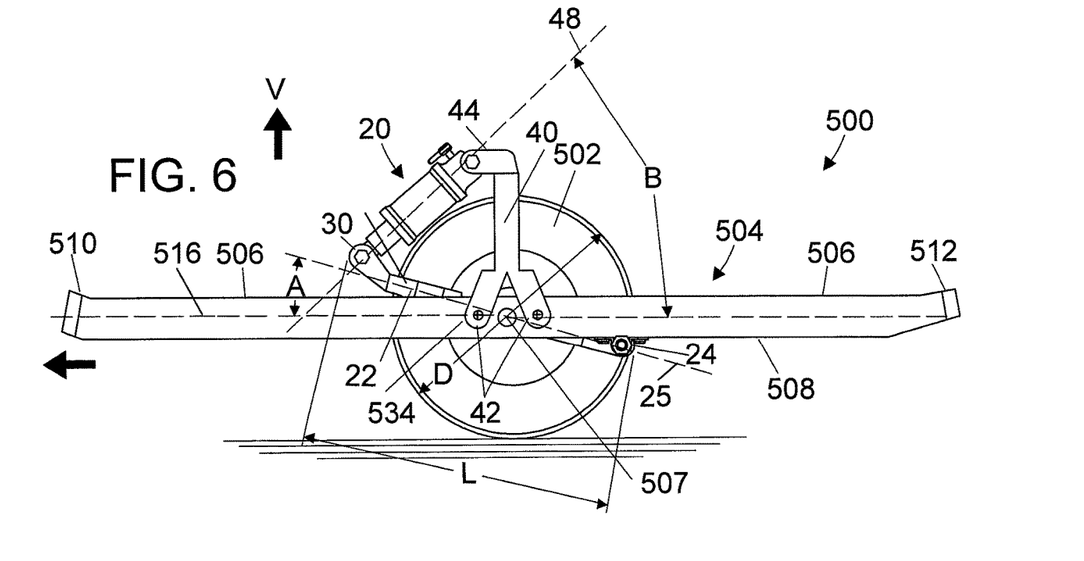
FIG. 6 is a side elevation view of the prior art one-wheeled transportation device with the present suspension system installed.

Wheel holder 22 is substantially U-shaped, wherein proximal end 24 includes a first proximal end 26 and a second proximal end 28, and distal end 30 is closed and includes a cross section 23. In the shown embodiment, first 26 and second 28 proximal ends are pivotally connectable to bottom side 508 of platform 504 so that wheel holder 22 passes though aperture 514 of the tiltable platform 504 of one-wheeled transportation device 500 (also refer to FIGS. 3, 5 and 6). Wheel holder 22 has a central axis 25, and is connectable to tiltable platform 504 so that central axis of wheel holder 22 forms an angle A of between 10° and 30° with the central longitudinal axis 516 of the tiltable platform 504. In the shown embodiment a first spindle 27 is disposed at first proximal end 26 and a second spindle 29 is disposed at second proximal end 28. In the shown embodiment spindles 27 and 27 are outwardly projecting. First 27 and second 29 spindles are pivotally connectable to bottom side 508 of tiltable platform 504 (refer to FIG. 7). In FIG. 6 it is noted that wheel holder 22 is connectable to one-wheeled transportation device 500 so that the axis of rotation 507 of wheel 502 resides between the top side 506 and the bottom side 508 of the tiltable platform 504. That is, axis of rotation 107 is is approximately in the same vertical position as in the unmodified one-wheeled transportation device 500 of FIGS. 1-4. Again referring to FIG. 6, it is noted that wheel holder 22 has a length L which is greater than the diameter D of wheel 502.

Suspension system 20 further includes a bracket 40 having a proximal end 42 and an opposite distal end 44. Bracket 40 is substantially U-shaped and proximal end 42 includes two bifurcated connectors one of which is connectable to the side of each side rail 534 and 536 of tiltable platform 504. Proximal end 42 of bracket 40 is connectable to the tiltable platform 504 so that distal end 44 of bracket 40 upwardly extends above the wheel 502. That is, bracket 40 overarches (goes over the top of) wheel 502.

Suspension system 20 further includes a shock absorber 46 which is pivotally connectable between distal end 30 of wheel holder 22 and distal end 44 of bracket 40. In FIG. 6 it is noted that shock absorber 46 has a longitudinal axis 48 which forms an angle B of between 40° and 60° with the central longitudinal axis 516 of the tiltable platform 504. In an embodiment shock absorber 46 is pneumatic, is air pressure adjustable, includes a response control (fast to slow), and can be locked to eliminate shock response.

Figure 7:
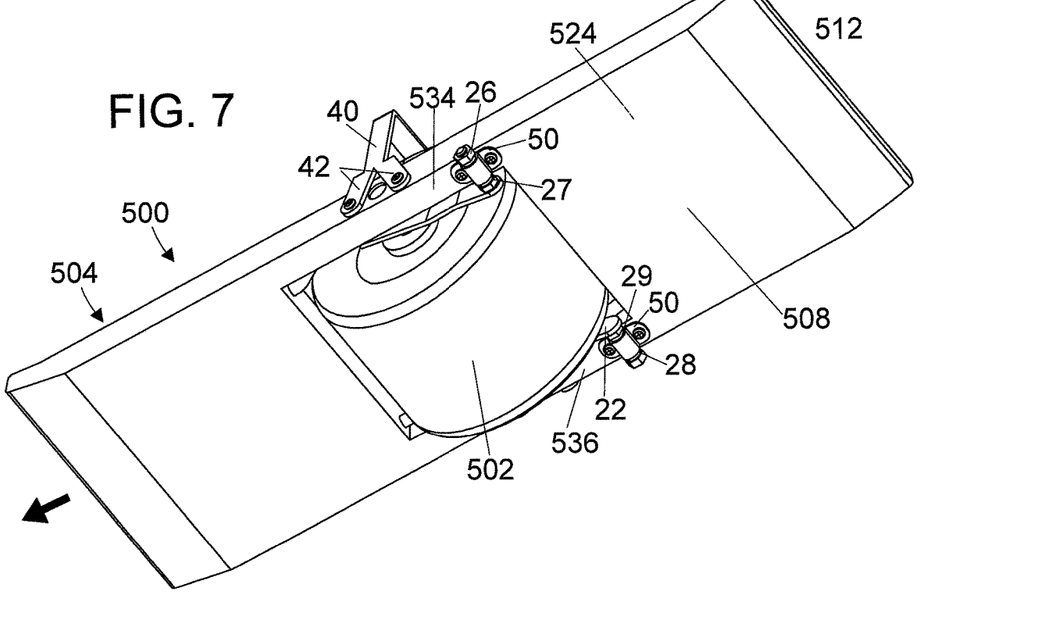
FIG. 7 is a bottom perspective view of the prior art one-wheeled transportation device with the present suspension system installed.
Figure 8:
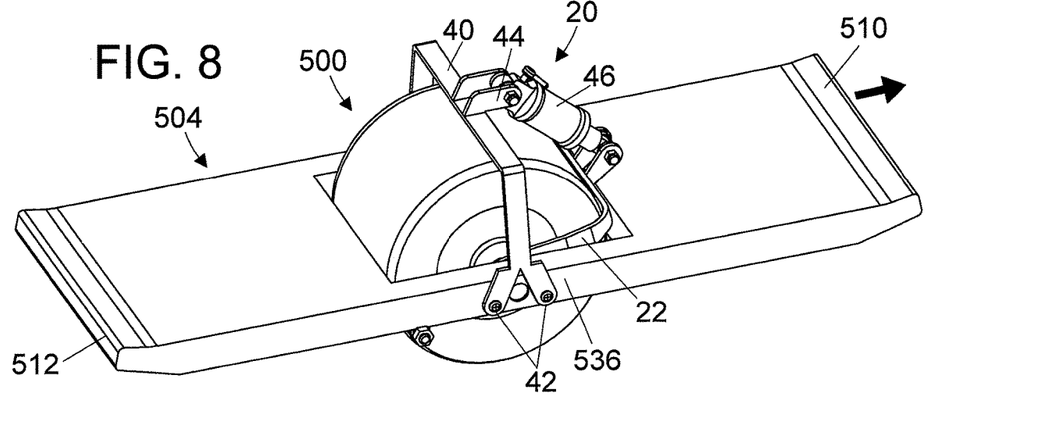
FIG. 8 is a reverse perspective view of the prior art one-wheeled transportation device with the present suspension system installed.

Referring to FIG. 7 it is noted that first spindle 27 of first proximal end 26 of wheel holder 22 is pivotally connected to the bottom side 508 of tiltable platform 504 by a U-clamp 50, and second spindle 29 of second proximal end 28 is also pivotally connected to the bottom side 508 of tiltable platform 504 by a U-clamp 50. In the shown embodiment the connections of the spindles 27 and 29 are on the bottom side 508 of tiltable platform 503 at side rails 534 and 536 and adjacent battery 524. Mounting holes are drilled in bottom side 508 of tiltable platform 504 to attach U-clamps 50.

In FIG. 11 it is noted that wheel holder 22 has sides which inward bend at 52. This inward bend is to avoid interference with battery cable 532 of tiltable platform 504 (refer to FIG. 3).

FIG. 12 is an exploded perspective view of wheel 502 and wheel holder 22. Wheel 502 is rotationally connected between stations A and B of wheel holder 22.

Figure 13:
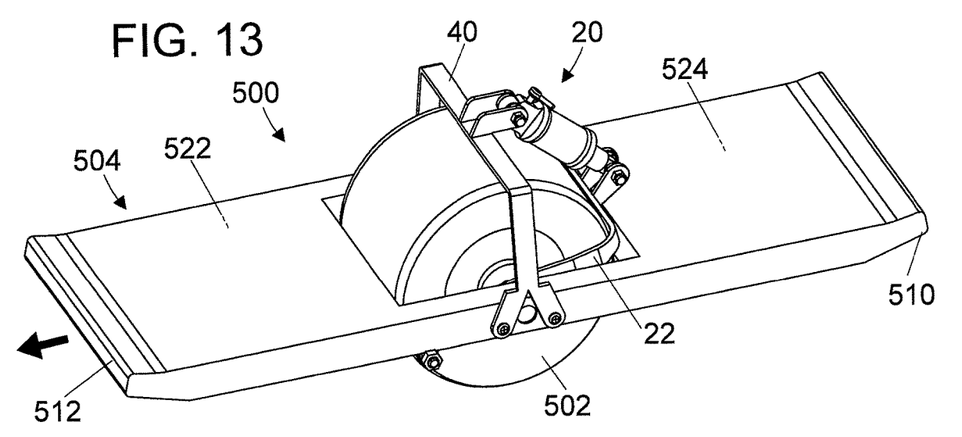
FIG. 13 is a perspective view of a different suspension system installation.

FIG. 13 is a perspective view of a different suspension system 20 installation. In this embodiment the definition of first end 510 and second end 512 has been reversed so that suspension system 20 is installed adjacent battery 524 rather than controller 522.

Figure 14:
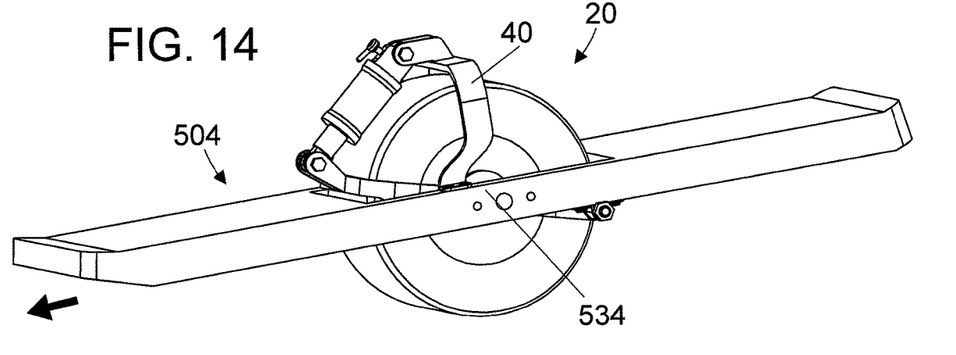
FIG. 14 is a perspective view of a second bracket embodiment.
Figure 15:
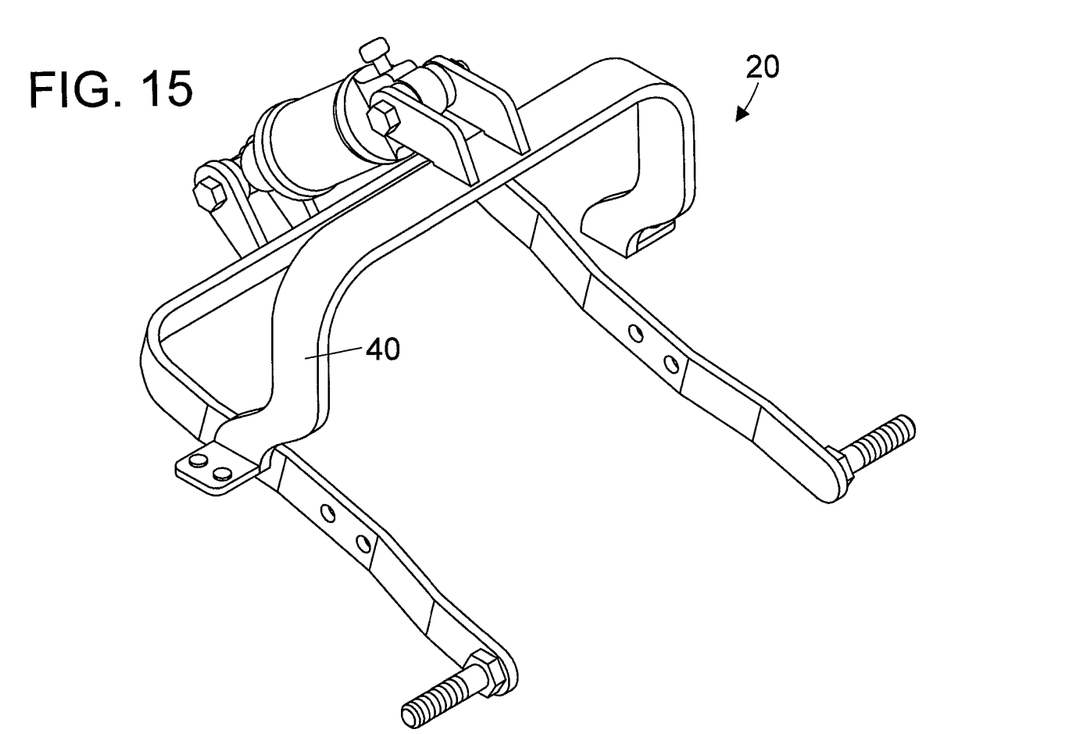
FIG. 15 is an enlarged perspective view of the second bracket embodiment.
Figure 16:
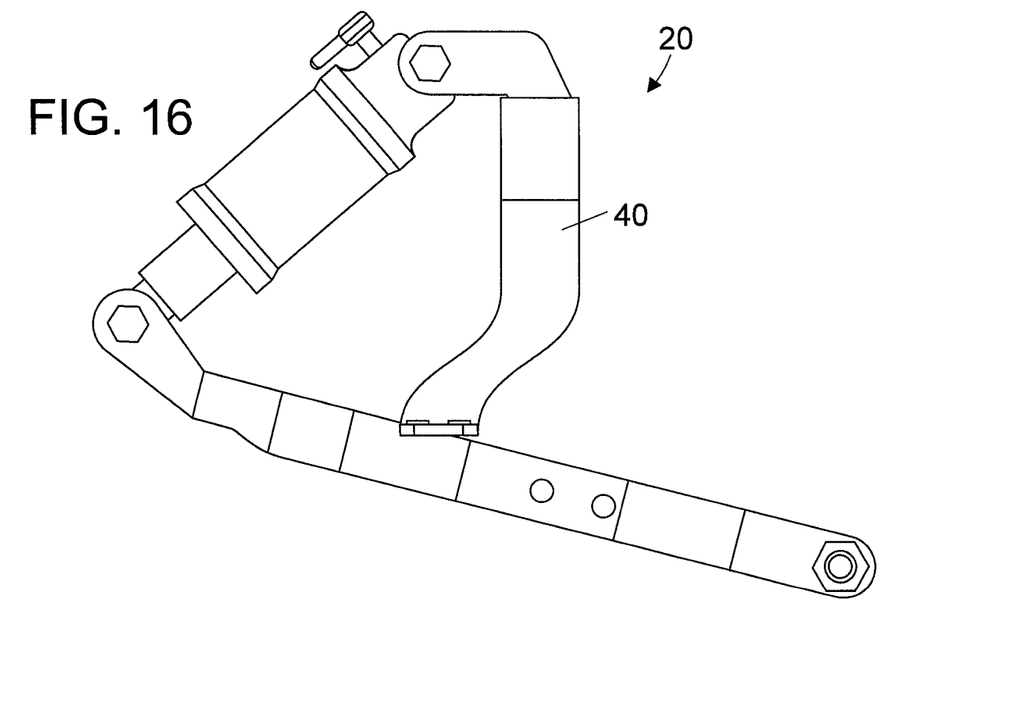
FIG. 16 is an enlarged side elevation view of the second bracket embodiment.

FIG. 14 is a perspective view of a different bracket 40. Instead of being installed on the side of side rails 534 and 536, bracket 40 is installed on the top of side rails 534 and 536 of tiltable platform 504. All other aspects of suspension system are the same as previously described. FIGS. 15 and 16 are enlarged perspective and enlarged side elevation views respectively showing the different bracket 40. In this embodiment, mounting holes are drilled in top side 8 of first 534 and second 536 side rails to attach bracket 40.

Figure 17:
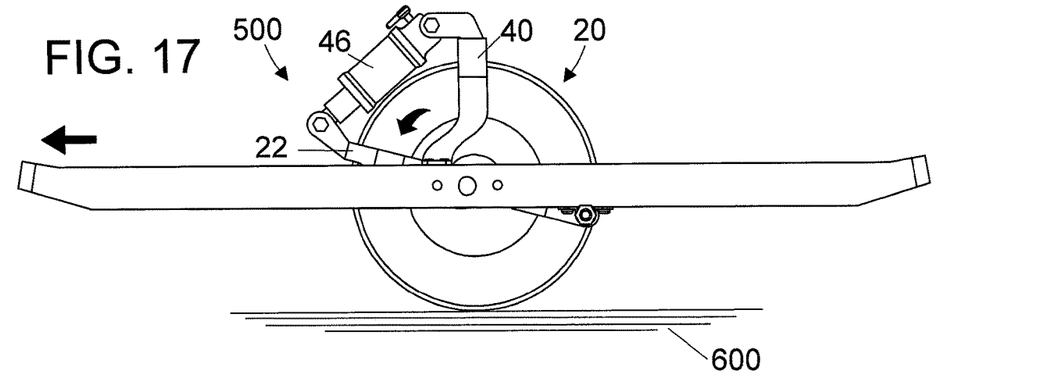
FIG. 17 is a side elevation view of the one-wheeled transportation device with suspension system traveling over a smooth support surface.
Figure 18:
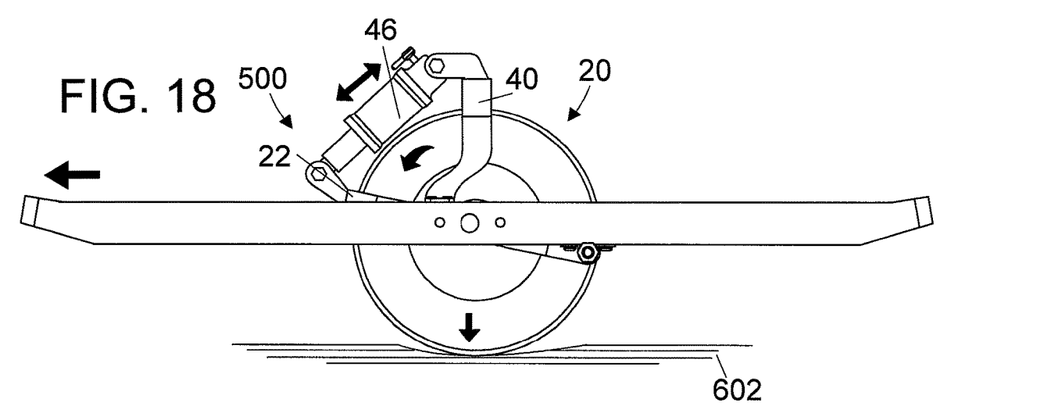
FIG. 18 is a side elevation view of the one-wheeled transportation device with suspension system traveling over a depression; and, FIG. 19 is a side elevation view of the one-wheeled transportation device with suspension system traveling over a bump.
Figure 19:
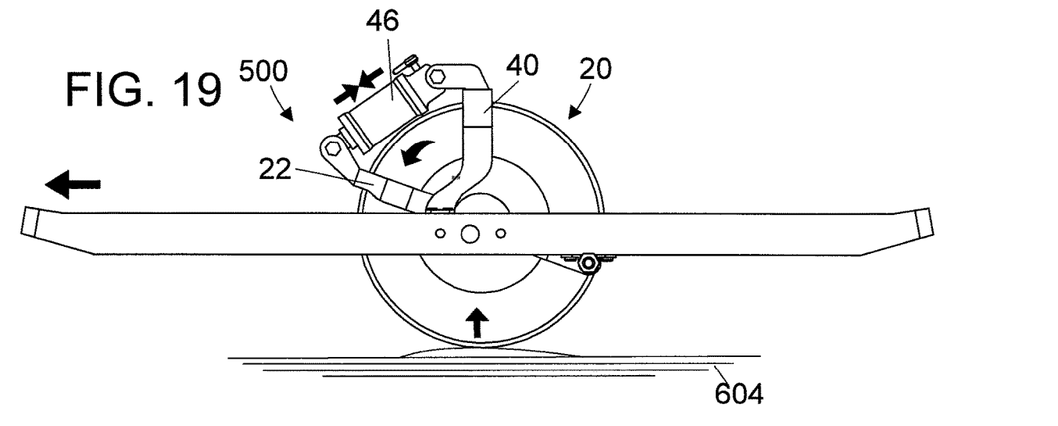

FIG. 17 is a side elevation view of the one-wheeled transportation device 500 with suspension system 20 traveling over a smooth support surface 600. FIG. 18 is a side elevation view of the one-wheeled transportation device 500 with suspension system 20 traveling over a support surface having a depression 602. FIG. 19 is a side elevation view of the one-wheeled transportation device 500 with suspension system 20 traveling over a support surface having a bump 604. In FIG. 17 one-wheeled transportation device 500 travels over smooth support surface 600 and shock absorber is in a quiescent state. In FIG. 18 one-wheeled transportation device 500 travels over a support surface having a depression 602 causing wheel 502 to move down which causes wheel holder 22 to move down and elongate shock absorber 46. Conversely in FIG. 19 one-wheeled transportation device 500 travels over a support surface having a bump 604 causing wheel 502 to move up which causes wheel holder 22 to move up and compress shock absorber 46.

It may be appreciated that one-wheeled transportation device 20 may be combined with suspension system 20 to form a one-wheeled tarnsportation device with suspension system.

In terms of use, a method for installing a suspension system 20 on a one-wheeled transportation device 500 includes: (refer to FIGS. 1-19)
 (a) providing a one-wheeled transportation device 500 having a wheel 502 and a tiltable platform 504, the tiltable platform 504 having a top side 506, a bottom side 508, a first end 510, a second end 512, a central longitudinal axis 516, and an aperture 514 which is shaped and dimensioned to receive the wheel 502;
 (b) providing a wheel holder 22 having a proximal end 24 and an opposite distal end 30;
 (c) providing a bracket 49 having a proximal end 42 and an opposite distal end 44;
 (d) providing a shock absorber 46;
 (e) removing the wheel 502 from the tiltable platform 504;
 (f) connecting the wheel 502 to the wheel holder 22;
 (g) pivotally connecting the proximal end 24 of the wheel holder 22 to the second end 512 of the tiltable platform 504;
 (h) connecting the proximal end 42 of the bracket 40 to the tiltable platform 504 so that the distal end 44 of the bracket 40 extends above the wheel 504; and,
 (i) connecting the shock absorber 46 between the distal end 26 of the wheel holder 22 and the distal end 44 of the bracket 40.

The method further including:
 in (a), the one-wheeled transportation device 50 having two axle blocks; and,
 after (e), removing the two axle blocks 528.

The method further including:
 in (g), pivotally connecting the proximal end 24 of the wheel holder 22 to the bottom side 508 of the tiltable platform 504 so that the wheel holder 22 passes through aperture 514 in tiltable platform 504.

The method further including:
 in (b), the proximal end 24 of the wheel holder i22 including first 27 and second 29 spindles; and,
 in (g), pivotally connecting the first 27 and second 29 spindles to the bottom side 508 of the tiltable platform 504.

The method further including:
 in (g), drilling mounting holes in the bottom side 508 of the tiltable platform 504.

The method further including:
 in (a), the tiltable platform 504 having a first side rail 534 and a second side rail 536; and,
 in (h), drilling mounting holes in the first side rail 534 and the second side rail 536.

It is noted that the order of the above cited steps can be changed. For example steps (g) and (h) could be reversed.

The embodiments of the suspension system for a one-wheeled transportation device and method described herein are exemplary and numerous modifications, combinations, variations, and rearrangements can be readily envisioned to achieve an equivalent result, all of which are intended to be embraced within the scope of the appended claims. Further, nothing in the above-provided discussions of the suspension system and method should be construed as limiting the invention to a particular embodiment or combination of embodiments. The scope of the invention is defined by the appended claims.

I claim:

1. A suspension system for a one-wheeled transportation device, the one-wheeled transportation device including (1) a wheel, and (2) a tiltable platform having a top side, a bottom side, a first end, a second end, a central longitudinal axis, and an aperture which is shaped and dimensioned to receive the wheel, the suspension system comprising:
 a wheel holder which is configured to rotationally carry the wheel, said wheel holder having a proximal end and an opposite distal end, said proximal end pivotably connectable to the second end of the tiltable platform so that said distal end resides above said top side at said first end;
 a bracket having a proximal end and an opposite distal end, said proximal end connectable to the tiltable platform so that said distal end of said bracket upwardly extends above the wheel; and,
 a shock absorber which is connectable between said distal end of said wheel holder and said distal end of said bracket.

2. The suspension system for a one-wheeled transportation device according to claim 1 further including:
 said proximal end of said wheel holder including a first proximal end and a second proximal end; and, said first proximal end and said second proximal end are both pivotably connectable to the bottom side of the tiltable platform so that said wheel holder passes though the aperture of the tiltable platform.

3. The suspension system for a one-wheeled transportation device according to claim 2 further including:
a first spindle disposed at said first proximal end and a second spindle disposed at said second proximal end, said first and second spindles pivotably connectable to the bottom side of the tiltable platform.

4. The suspension system for a one-wheeled transportation device according to claim 1, further including:
said wheel holder having a central axis; and,
said wheel holder connectable to the one-wheeled transportation device so that said central axis of said wheel holder forms an angle of between 10° and 30° with the central longitudinal axis of the tiltable platform.

5. The suspension system for a one-wheeled transportation device according to claim 1, the wheel having an axis of rotation, the suspension system further including:
said wheel holder connectable to the one-wheeled transportation device so that the axis of rotation of the wheel resides between the top side and the bottom side of the tiltable platform.

6. The suspension system for a one-wheeled transportation device according to claim 1, the wheel of the one-wheeled transportation device having a diameter, the suspension system further including:
said wheel holder having a length, said length being greater than the diameter of the wheel.

7. The suspension system for a one-wheeled transportation device according to claim 1, further including:
said shock absorber having a longitudinal axis; and,
said longitudinal axis of said shock absorber configured to form an angle of between 40° and 60° with the central longitudinal axis of the tiltable platform.

8. The suspension system for a one-wheeled transportation device according to claim 1 further including:
said wheel holder having an inward bend.

9. The suspension system for a one-wheeled transportation device according to claim 1, the wheel of the one-wheeled transportation device having a diameter and an axis of rotation, the suspension system further including:
said proximal end of said wheel holder including a first proximal end and a second proximal end;
said first proximal end and said second proximal end are both pivotably connectable to the bottom side of the tiltable platform so that said wheel holder passes though the aperture of the tiltable platform;
a first spindle disposed at said first proximal end and a second spindle disposed at said second proximal end, said first and second spindles pivotably connectable to the bottom side of the tiltable platform;
said wheel holder having a central axis;
said wheel holder connectable to the one-wheeled transportation device so that said central axis of said wheel holder forms an angle of between 10° and 30° with the central longitudinal axis of the tiltable platform;
said wheel holder connectable to the one-wheeled transportation device so that the axis of rotation of the wheel resides between the top side and the bottom side of the tiltable platform;
said wheel holder having a length, said length being greater than the diameter of the wheel;
said shock absorber having a longitudinal axis;
said longitudinal axis of said shock absorber configured to form an angle of between 40° and 60° with the central longitudinal axis of the tiltable platform; and,
said wheel holder having an inward bend.

10. A one-wheeled transportation device with suspension system, comprising:
a wheel;
a tiltable platform having a top side, a bottom side, a first end, a second end, a central longitudinal axis, and an aperture which is shaped and dimensioned to receive said wheel;
a wheel holder which rotationally carries said wheel, said wheel holder having a proximal end and an opposite distal end, said proximal end pivotably connected to said second end of said tiltable platform so that said distal end resides above said top side at said first end;
a bracket having a proximal end and an opposite distal end, said proximal end connected to said tiltable platform so that said distal end of said bracket upwardly extends above said wheel; and,
a shock absorber which is connected between said distal end of said wheel holder and said distal end of said bracket.

11. The one-wheeled transportation device with suspension system according to claim 10 further including:
said proximal end of said wheel holder including a first proximal end and a second proximal end; and,
said first proximal end and said second proximal end are both pivotably connected to said bottom side of said tiltable platform so that said wheel holder passes though said aperture of said tiltable platform.

12. The one-wheeled transportation device with suspension system according to claim 11 further including:
a first spindle disposed at said first proximal end and a second spindle disposed at said second proximal end, said first and second spindles pivotably connected to said bottom side of said tiltable platform.

13. The one-wheeled transportation device with suspension system according to claim 10, further including:
said wheel holder having a central axis; and,
said wheel holder connected to said one-wheeled transportation device so that said central axis of said wheel holder forms an angle of between 10° and 30° with said central longitudinal axis of said tiltable platform.

14. The one-wheeled transportation device with suspension system according to claim 10 further including:
said wheel having an axis of rotation;
said wheel holder connected to said one-wheeled transportation device so that said axis of rotation of said wheel resides between said top side and said bottom side of said tiltable platform.

15. The one-wheeled transportation device with suspension system according to claim 10 further including:
said wheel of said one-wheeled transportation device having a diameter; and,
said wheel holder having a length, said length being greater than said diameter of said wheel.

16. The one-wheeled transportation device with suspension system according to claim 10 further including:
said shock absorber having a longitudinal axis; and,
said longitudinal axis of said shock absorber forming an angle of between 40° and 60° with said central longitudinal axis of said tiltable platform.

17. The one-wheeled transportation device with suspension system according to claim 10 Further including:
said wheel holder having an inward bend.

18. The one-wheeled transportation device with suspension system according to claim 10 further including:
   said proximal end of said wheel holder including a first proximal end and a second proximal end;
   said first proximal end and said second proximal end both pivotably connectable to said bottom side of said tiltable platform so that said wheel holder passes though said aperture of said tiltable platform;
   a first spindle disposed at said first proximal end and a second spindle disposed at said second proximal end, said first and second spindles pivotably connected to said bottom side of said tiltable platform;
   said wheel holder having a central axis;
   said wheel holder connected to said one-wheeled transportation device so that said central axis of said wheel holder forms an acute angle of between 10° and 30° with said central longitudinal axis of said tiltable platform;
   said wheel having an axis of rotation;
   said wheel holder connected to said one-wheeled transportation device so that said axis of rotation of said wheel resides between said top side and said bottom side of said tiltable platform;
   said wheel having a diameter;
   said wheel holder having a length, said length being greater than said diameter of said wheel;
   said shock absorber having a longitudinal axis;
   said longitudinal axis of said shock absorber forming an angle of between 40° and 60° with said central longitudinal axis of said tiltable platform; and,
   said wheel holder having an inward bend.

19. A method for installing a suspension system on a one-wheeled transportation device comprising:
   (a) providing a one-wheeled transportation device having a wheel, and a tiltable platform, said tiltable platform having a top side, a bottom side, a first end, a second end, a central longitudinal axis, and an aperture which is shaped and dimensioned to receive said wheel;
   (b) providing a wheel holder having a proximal end and an opposite distal end;
   (c) providing a bracket having a proximal end and an opposite distal end;
   (d) providing a shock absorber;
   (e) removing said wheel from said tiltable platform;
   (f) connecting said wheel to said wheel holder;
   (g) pivotally connecting said proximal end of said wheel holder to said second end of said tiltable platform;
   (h) connecting said proximal end of said bracket to said tiltable platform so that said distal end of said bracket extends above said wheel; and,
   (i) connecting said shock absorber between said distal end of said wheel holder and said distal end of said bracket.

20. The method of claim 19 further including:
   in (a), said one-wheeled transportation device having two axle blocks; and,
   after (e), removing said two axle blocks.

21. The method of claim 19 further including:
   in (g), pivotally connecting said proximal end of said wheel holder to said bottom side of said tiltable platform so that said wheel holder passes through said aperture in said tiltable platform.

22. The method of claim 19 further including:
   in (b), said proximal end of said wheel holder including first and second spindles; and,
   in (g), pivotally connecting said first and second spindles to said bottom side of said tiltable platform.

23. The method of claim 19, further including:
   in (g), drilling mounting holes in said bottom side of said tiltable platform.

24. The method of claim 19, further including:
   in (a), said tiltable platform having a first side rail and a second side rail; and,
   in (h), drilling mounting holes in said first side rail and said second side rail.

* * * * *